Dec. 4, 1934.   J. W. ROSS   1,982,761
GLASS FEEDER
Filed May 31, 1932
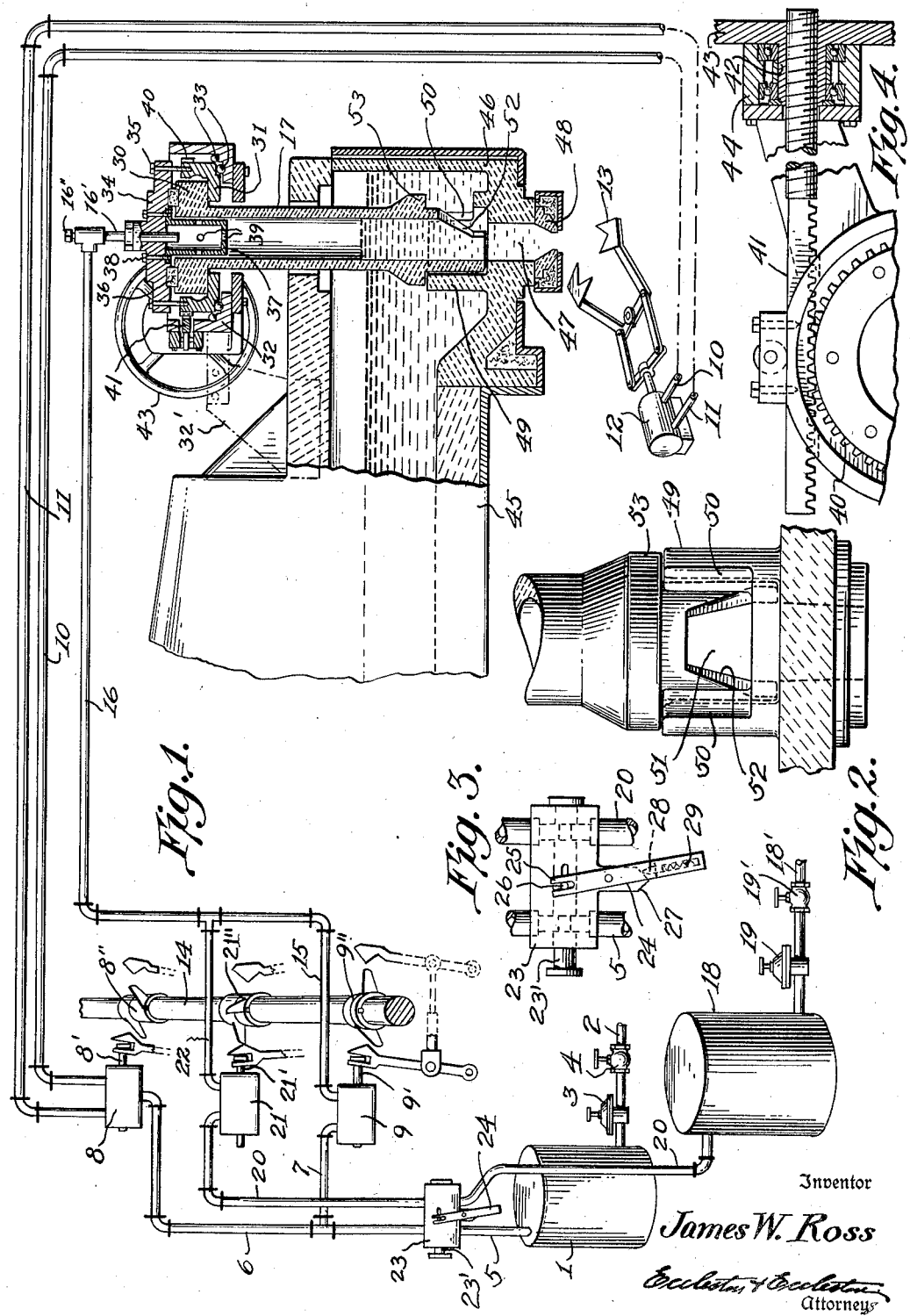
Inventor
James W. Ross
Eccleston & Eccleston
Attorneys Patented Dec. 4, 1934

1,982,761

UNITED STATES PATENT OFFICE 1,982,761

GLASS FEEDER

James W. Ross, Washington, Pa., assignor to Hazel-Atlas Glass Company, Wheeling, W. Va., a corporation of West Virginia Application May 31, 1932, Serial No. 614,579

6 Claims. (Cl. 49—55)

The invention relates particularly to glass feeders of the pneumatic type, wherein the glass is subjected to air pressures alternately above and below atmospheric pressure, to form the gobs or charges, which are then cut off and dropped into a mold; this type of feeder being disclosed in the patent to Hitchcock No. 805,068.

In the present feeder the flow of glass is regulated by the rotary adjustment of a tube or bell with respect to a baffle wall, and one of the objects of the present invention is to improve such control means by preventing the molten glass from working down between the wall of the tube and the baffle wall.

Another object of the invention is to provide a construction which will permit a finer adjustment of the rate of flow of glass, particularly when the rate of flow has been considerably throttled down.

A further object of the invention is to provide a construction which will permit the glass to flow freely through the restricted region between the tube or air bell and the front wall of the flow spout.

Another object of the invention is to generally improve and simplify the construction of feeders of the penumatic type and to increase the efficiency thereof.

Numerous other objects and advantages of the invention will be apparent from the following detailed description, when taken in connection with the accompanying drawing; in which, Figure 1 is a vertical sectional view through the flow spout, the tube and associated parts; the shears, air lines, valves, etc., being illustrated diagrammatically.

Figure 2 is a front elevational view of the lower portion of the tube and associated parts; the floor of the nose block being in section.

Figure 3 is a fragmentary view illustrating a vacuum and pressure shut off valve; and, Figure 4 is a fragmentary view of the mechanism for rotating the air tube or bell.

Mechanisms for alternately supplying pressure to opposite ends of a cylinder for operating the shears and for alternately applying plus and minus pressures, hereinafter termed pressure and vacuum, to the surface of the glass over the flow orifice, and for timing such applications, are old and well known, and any such old and well known mechanism may be employed for this purpose. It will therefore be understood that the particular mechanism shown herein including valves, cams, etc., for controlling the pressure for operating the shears and for controlling the application of pressure and vacuum to the glass, and now to be described, is to be considered merely as illustrative and not as limiting the invention to use with this particular mechanism.

Numeral 1 indicates a pressure tank to which air under pressure is supplied by pipe 2 leading from any desired source of pressure. This pipe is preferably provided with a pressure gage 3, and may be provided with an ordinary shut-off valve 4.

Pipe 5 leads from the pressure tank and is divided into two branches, 6 and 7; branch 6 leading to valve 8, and branch 7 leading to valve 9. Two pipes, 10 and 11, lead from the valve 8; one of these pipes leading to the front end of cylinder 12 which operates the shears 13 for severing the formed charges or gobs, and the other of these pipes leading to the rear end of the same cylinder.

When the valve spindle 8', of valve 8, is moved in one direction it will admit air, through pipe 11, to the rear end of shear cylinder 12 to close the shears and sever the formed gob; and the valve spindle will immediately be moved in the opposite direction to admit pressure to the front end of the shear cylinder to open the shears, which remain open until the valve spindle is again operated to close the shears. The valve spindle 8' is moved back and forth at the desired times by the cam 8" keyed or otherwise secured to the revolving shaft 14 driven by any suitable mechanism, usually from the cam shaft of the glass forming machine to which the glass charges are delivered.

Leading from valve 9 is a pipe 15, which connects with a pipe 16 leading to the interior of the vacuum and pressure tube or bell 17. When the valve spindle 9' is moved in one direction air under pressure will flow from the pressure tank 1 to the interior of the bell, and when the spindle is moved in the opposite direction communication will be shut off between the pressure tank and the bell; the air under pressure remaining in the bell until communication is opened with a source of vacuum. The valve spindle 9' is moved back and forth at the desired times by the cam 9" keyed or otherwise secured to the continuously revolving cam shaft 14.

Numeral 18 indicates a vacuum tank in which a partial vacuum is maintained by communication with a factory vacuum line 18'. The degree of vacuum is maintained constant by an ordinary pressure regulator 19; and if desired a hand valve 19' is provided to shut off the vacuum line when the regulator is to be repaired or when operations are to cease. A line 20 leads from the vacuum tank 18 to a valve 21; and leading from this valve is a line 22 which connects with the hereinbefore described line 16 communicating with the interior of bell 17. When the valve stem 21' is moved in one direction communication will be opened between the vacuum tank and the interior of the air bell 17, whereupon the bell will be vacuumized to the desired degree. When the valve stem is moved in the opposite direction communication will be shut off between the vacuum tank and air bell; and the interior of the air bell will remain partially vacuumized until communication is opened between the air bell and the pressure tank by the operation of valve 9. Valve spindle 21' is moved back and forth at the desired times by the cam 21" keyed or otherwise fixed to the cam shaft 14.

Numeral 23 refers to a shut-off valve which may be employed for simultaneously shutting off or opening the lines from the pressure tank and vacuum tank. When the valve spindle 23' is moved in one direction the lines from both tanks are fully open and when moved in the opposite direction both lines are entirely closed. The valve spindle is moved by the hand lever 24 pivoted on the valve casing and having a forked end 25 engaging a pin 26 on the valve spindle. In order to prevent the valve spindle from assuming any position intermediate its fully open or fully closed positions, the valve casing is provided with a fixed pointed keeper 27, and the hand lever is provided with a cooperating pointed latch 28 pressed upwardly by a spring 29. The cooperating pointed keeper and latch permit the valve spindle to be moved to its full extent in either direction, to fully open communication with the pressure and vacuum tanks or to fully close communication with both tanks, but do not permit the spindle to rest in any intermediate position.

The vacuum and pressure tube or bell 17 may be mounted and rotatably adjusted by any desired mechanism. In the preferred form, as illustrated, the upper end of the tube is provided with an outwardly projecting flange 30 carried by a ring 31 which is rotatably mounted in a holder 32 fixed upon a bracket 32'; anti-friction bearings 33 being preferably provided between the ring and holder. A cover 34 is arranged over the top of the tube, and the cover, tube and ring are clamped together by means of bolts 35 extending through the cover into the ring; the construction being rendered airtight by a gasket 36 clamped between the cover and the upper end of the tube.

As mentioned hereinbefore the pipe 16 leads to the pressure and vacuum tube 17. In the preferred construction a short vertical pipe section 16' enters the tube and is connected with the pipe 16 by means of a T; the upper end of the T being closed by means of a removable screw plug 16".

A false head 37 surrounds that portion of pipe section 16' projecting into the vacuum and pressure tube and extends downwardly some little distance below the end of the pipe. The false head is secured to the cover by means of bolts 38; and the bottom and side walls of the false head are provided with openings 39. The purpose of the false head is to prevent the pipe section 16' from becoming clogged in the event that the glass should rise too high in the tube. If the opening in the bottom of the false head should become clogged it can easily be cleared by removing the screw plug 16" and passing a rod downwardly through the pipe section 16'.

Any preferred mechanism may be employed for rotatably adjusting the pressure and vacuum tube. In the preferred construction the ring 31 is provided with gear teeth 40, meshing with the teeth of a rack bar 41. The opposite end of the rack bar is threaded through the hub 42 of a hand wheel 43; the hub being appropriately mounted in a housing 44 to prevent movement thereof longitudinally of the bar. Thus by rotation of the hand wheel the rack bar will be moved forward or backward, thus rotating the tube 17 in the desired direction and to the desired extent to permit a proper volume of glass to flow into the tube.

Numeral 45 refers to the conventional flow spout through which glass flows from the furnace (not shown); and numeral 46 refers generally to the nose block at the forward end of the flow spout. The floor of the nose block is provided with the usual flow orifice 47, and below this orifice is the ordinary removable bushing 48.

It is to be particularly noted that the floor of the nose block is at a lower level than the floor of the flow spout, to provide a head of glass about five or six inches greater over the floor of the nose block, for a purpose which will presently appear.

Projecting upwardly from the floor of the nose block, and preferably integral therewith, is a circular baffle wall or flange 49. This baffle wall does not extend entirely around the flow orifice, but ends some little distance on each side of the center line of the flow spout, as indicated by numerals 50, 50, to form an opening or passage. This opening or passage faces the front end of the flow spout or nose block, so that the glass must flow around the baffle wall before it can enter the tube through the passage.

The tube 17 extends downwardly in the glass to the floor of the nose block, except for a clearance of a small fraction of an inch, and the lower end of the tube is housed within the circular baffle wall. The lower end of the tube is provided with an opening or passage 51 which is adapted to register to the desired extent with the passage in the circular baffle wall, as clearly shown in Figure 2. The height of the opening 51 is less than the height of the baffle wall; and, of course, a very slight clearance is provided between the lower portion of the tube and the circular wall to facilitate the rotary adjustment of the tube. When the tube is adjusted to the right or left from the fully open position shown in Figure 2, the effective size of the opening 51 leading into the interior of the tube will be reduced, thereby reducing the volume flow of glass into the interior of the tube. It is thus apparent that the volume flow of glass can be regulated by this simple rotary adjustment of the tube 17.

An application Ser. No. 447,387, filed April 25, 1930 by David Stenhouse shows the lower end of a tube associated with a circular baffle wall, and the tube and wall having openings adapted to register to the desired extent. In such Stenhouse application the end walls of the opening in the baffle wall are vertical and the end walls of the opening in the lower portion of the tube are vertical. In such construction, when the tube is adjusted for a small volume flow of glass some difficulty is encountered in making a very fine adjustment. Due to the nature of molten glass, it will not freely flow through a very narrow opening. Suppose that in the Stenhouse construction the tube is adjusted to a very small volume flow, which adjustment would bring a vertical end wall of the opening of the tube rather close to vertical end wall in the opening in the circular baffle. Suppose now that a fine adjustment is desired in the structure of the Stenhouse application to very slightly reduce the volume flow. If then the tube is adjusted slightly to bring the two vertical end walls closer together, such adjustment instead of slightly decreasing the flow might stop it entirely, by reason of the two end walls being so close together that glass will not flow through the narrow opening. By reference to the drawing of the present application it will be noted that the end walls of the opening 51 in the tube are inclined, as indicated by numeral 52, while the end walls of the opening in the baffle wall are vertical. By this simple construction, when the tube has been adjusted to a small volume flow, the opening will be of a general triangular shape instead of a long narrow slot. Consequently, when a further fine adjustment becomes necessary and the tube is given a slight rotary movement to reduce the volume flow, it will simply reduce somewhat the area of the general triangular shaped opening, thereby slightly reducing the flow, but without the possibility of stopping the flow entirely. Of course, even in this improved construction, it is possible to have the volume flow so low that any further reducing adjustment would make the triangular opening so small that glass would not flow through it. It will be at once apparent, however, that such a condition would not be met in actual practice, because the volume of glass fed through a feeder is never so small that it would not flow through a triangular shaped opening or the equivalent.

The above described construction permits a very fine adjustment of the volume flow within any range in which a feeder is used commercially. While the end walls of the opening in the tube have been described as inclined and the end walls of the opening in the baffle as vertical, it will be apparent that the same result would be obtained by inclining the end walls of the opening in the baffle and having the end walls of the opening in the tube vertical; as, the end walls of both openings could be inclined but in opposite directions; or both openings could be made circular or oval, etc. In other words, this feature of the invention is not limited to any particular shape which the opening assumes under reduced flow, but contemplates any shape of opening which will permit a fine regulation when under reduced flow, as distinguished from an opening in which parallel walls approach each other under reduced flow so that when the opening is rather narrow the flow therethrough may be irregular or may stop entirely if a further slight reducing adjustment is made.

As mentioned hereinbefore a slight clearance is provided between the circular baffle wall and the lower portion of the tube housed within the baffle wall, to facilitate the rotary adjustment of the tube. If through wear of the parts, or by reason of some irregularity in the formation of the parts this clearance should become great enough to permit the seepage of glass therethrough, the efficiency of the volume flow control by the rotary adjustment of the tube would be somewhat impaired. In the present invention the possibility of such a condition arising is greatly reduced by forming on the tube a shoulder or flange 53 which overlies the top of the circular baffle wall.

In feeder constructions the space is rather limited between the feeding element, whether it be a pressure and vacuum tube or a reciprocating plug, and the front end of the nose block. This is due to the fact that the distance the nose block extends forwardly is limited by certain moving parts of the glass forming machine, and the feeding element must be directly over the molds which receive the glass charges. In the present feeder a baffle wall extends around the lower end of the tube (except for the opening left for the flow of glass into the tube), and a shoulder is formed on the tube to cooperate with the top of the baffle wall, whereby the region between the feeder element and the front of the nose block is still further restricted.

Thus the flowing glass in this region is somewhat obstructed, and when the feeder is operating at a fast rate and with rather large charges the flow of glass might not be sufficient or it might be somewhat irregular, thereby causing difficulties in weight control of the charges. In accordance with the present invention such a condition is avoided. By reference to Figure 1 it will be noted that the bottom of the nose block has been dropped a considerable distance, whereby the depth of the glass over the bottom of the nose block is considerably greater than that of the glass in the flow spout; the level of the glass remaining as before. By thus lowering the bottom of the nose block, the baffle wall is correspondingly lowered, and the shoulder or flange 53 on the pressure and vacuum tube is of necessity lowered to the same extent. The result is that the baffle and shoulder are a considerable distance below the level of the glass, and this increased head of glass causes a free flow of glass through the restricted region, even when the feeder is being operated to feed a maximum volume of glass.

The distance the bottom of the nose block is dropped below the bottom of the flow spout is preferably about five or six inches, but it will be understood that this distance may vary widely in different installations.

From the foregoing description it will be apparent to those skilled in the art, that the present invention provides a feeder of the pressure and vacuum type in which the volume flow of glass can be very accurately regulated even when the feeder is operating at a very low rate of flow; in which seepage of glass between the baffle wall and pressure and vacuum tube is prevented under ordinary condition; in which there is a free flow of glass through the restricted region between the tube and the front of the nose block even when the feeder is being operated to feed a maximum volume of glass; and in which the construction is very simple and yet highly efficient in operation.

While I have described the preferred embodiment of my invention, it is to be understood that such invention is subject to many changes and modifications, all of which changes and modifications are intended to be included within the scope of the appended claims.

What I claim is:

1. A pneumatic glass feeder including a flow spout having a flow orifice in the bottom thereof, a pressure and vacuum tube projecting into the glass in alignment with the flow orifice, means for periodically increasing and decreasing the pressure in the tube, a baffle wall encircling the lower end of the tube and provided with an opening, the lower portion of the tube provided with an opening adapted to align with the opening in the baffle wall, means for rotatably adjusting the tube to regulate the volume flow of glass through said openings, the cooperating sides of said openings being inclined toward each other.

2. A pneumatic glass feeder including a flow spout having a flow orifice in the bottom thereof, a pressure and vacuum tube projecting into the glass in alignment with the flow orifice, means for periodically increasing and decreasing the pressure in the tube, a baffle wall encircling the lower end of the tube and provided with an opening, the lower portion of the tube provided with an opening adapted to align with the opening in the baffle wall, means for rotatably adjusting the tube to regulate the volume flow of glass through said openings, one side of one of said openings being vertical and one side of the other opening being inclined.

3. A pneumatic glass feeder including a flow spout having a flow orifice in its bottom, a tube projecting into the glass in alignment with the flow orifice, a baffle wall surrounding the lower portion of the tube, said tube and wall provided with openings adapted to cooperate to control the flow of glass into the interior of the tube, and a shoulder on said tube overlying the top of said wall.

4. A pneumatic glass feeder including a flow spout having a flow orifice in its bottom, the plane of the top of the flow orifice being substantially lower than the plane of the bottom of the flow spout, a pressure and vacuum tube projecting downwardly into the glass substantially to the top of the flow orifice, a baffle wall surrounding the flow orifice and encircling the lower end of the tube, the tube and baffle being adjacent the forward end of the flow spout and having openings adapted to cooperate to control the flow of glass to the interior of the tube, means for rotating the tube, and a shoulder carried by the tube and overlying the top of the baffle wall.

5. A pneumatic glass feeder including a flow spout having a flow orifice in its bottom, the portion of the bottom of the flow spout having the flow orifice being at a substantially lower level than that of the remainder of the flow spout bottom, a pressure and vacuum tube extending downwardly into the glass in alignment with the flow orifice, the lower portion of said tube provided with a lateral opening, a baffle wall outside of said tube and cooperating with the lateral opening to control the flow of glass to the interior of the tube, and a shoulder on the tube overlying the top of the baffle wall, said shoulder being a substantial distance below the level of the glass.

6. A pneumatic glass feeder including a flow spout having a flow orifice in the bottom thereof, the plane of the top of the flow orifice being substantially lower than the plane of the bottom of the flow spout, a pressure and vacuum tube projecting into the glass in alignment with the flow orifice, means for periodically increasing and decreasing the pressure in the tube, a baffle wall encircling the lower end of the tube and provided with an opening, the lower portion of the tube provided with an opening adapted to align with the opening in the baffle wall, means for rotatably adjusting the tube to regulate the volume flow of glass through said openings, the sides of one of said openings being vertical and the sides of the other opening being inclined, and a shoulder formed on the tube and overlying the top of the baffle wall.

JAMES W. ROSS.